US010218066B2

(12) United States Patent
Su et al.

(10) Patent No.: US 10,218,066 B2
(45) Date of Patent: Feb. 26, 2019

(54) ANTENNA STRUCTURE AND WIRELESS COMMUNICATION DEVICE USING THE SAME

(71) Applicant: Chiun Mai Communication Systems, Inc., New Taipei (TW)

(72) Inventors: Wei-Cheng Su, New Taipei (TW); Yen-Hui Lin, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 98 days.

(21) Appl. No.: 14/497,088

(22) Filed: Sep. 25, 2014

(65) Prior Publication Data

US 2015/0138033 A1 May 21, 2015

(30) Foreign Application Priority Data

Nov. 21, 2013 (CN) .......................... 2013 1 0586278

(51) Int. Cl.
*H04Q 9/04* (2006.01)
*H01Q 1/52* (2006.01)
*H01Q 1/24* (2006.01)
*H01Q 9/04* (2006.01)

(52) U.S. Cl.
CPC ............. *H01Q 1/526* (2013.01); *H01Q 1/243* (2013.01); *H01Q 9/0428* (2013.01)

(58) Field of Classification Search
CPC .... H01Q 1/526; H01Q 9/0407; H01Q 9/0428; H01Q 1/243
USPC ................................. 343/841, 702, 845, 872
See application file for complete search history.

(56) References Cited

U.S. PATENT DOCUMENTS

2008/0143602 A1* 6/2008 Mak ......................... H01Q 3/24 342/374
2008/0284661 A1* 11/2008 He ....................... H01Q 9/0421 343/700 MS
2010/0231481 A1* 9/2010 Chiang .................. H01Q 1/243 343/898
2012/0313834 A1* 12/2012 Eom ...................... H01Q 1/243 343/787
2014/0055309 A1* 2/2014 Jenwatanavet ........ H01Q 1/273 343/718

FOREIGN PATENT DOCUMENTS

CN 103022637 A 4/2013
CN 203026635 U 6/2013

* cited by examiner

*Primary Examiner* — Jessica Han
*Assistant Examiner* — Jae Kim
(74) *Attorney, Agent, or Firm* — ScienBiziP, P.C.

(57) ABSTRACT

An antenna structure includes a first radiation arm, a second radiation arm, a feed end, and a ground end. The second radiation arm is perpendicularly connected to the first radiation arm. The first radiation arm and the second radiation arm jointly form a junction, both the feed end and the ground end are positioned adjacent to the junction.

7 Claims, 7 Drawing Sheets

ANTENNA STRUCTURE AND WIRELESS COMMUNICATION DEVICE USING THE SAME

FIELD

The disclosure generally relates to antenna structures, and particularly to a planar inverted-F antenna (PIFA) structure, and a wireless communication device using the same.

BACKGROUND

Antennas are used in wireless communication devices such as mobile phones. The wireless communication device uses a multiband antenna to receive/transmit wireless signals at different frequencies, such as global positioning system (GPS) signals.

BRIEF DESCRIPTION OF THE DRAWINGS

Implementations of the present technology will now be described, by way of example only, with reference to the attached figures.

DETAILED DESCRIPTION

Figure 1:
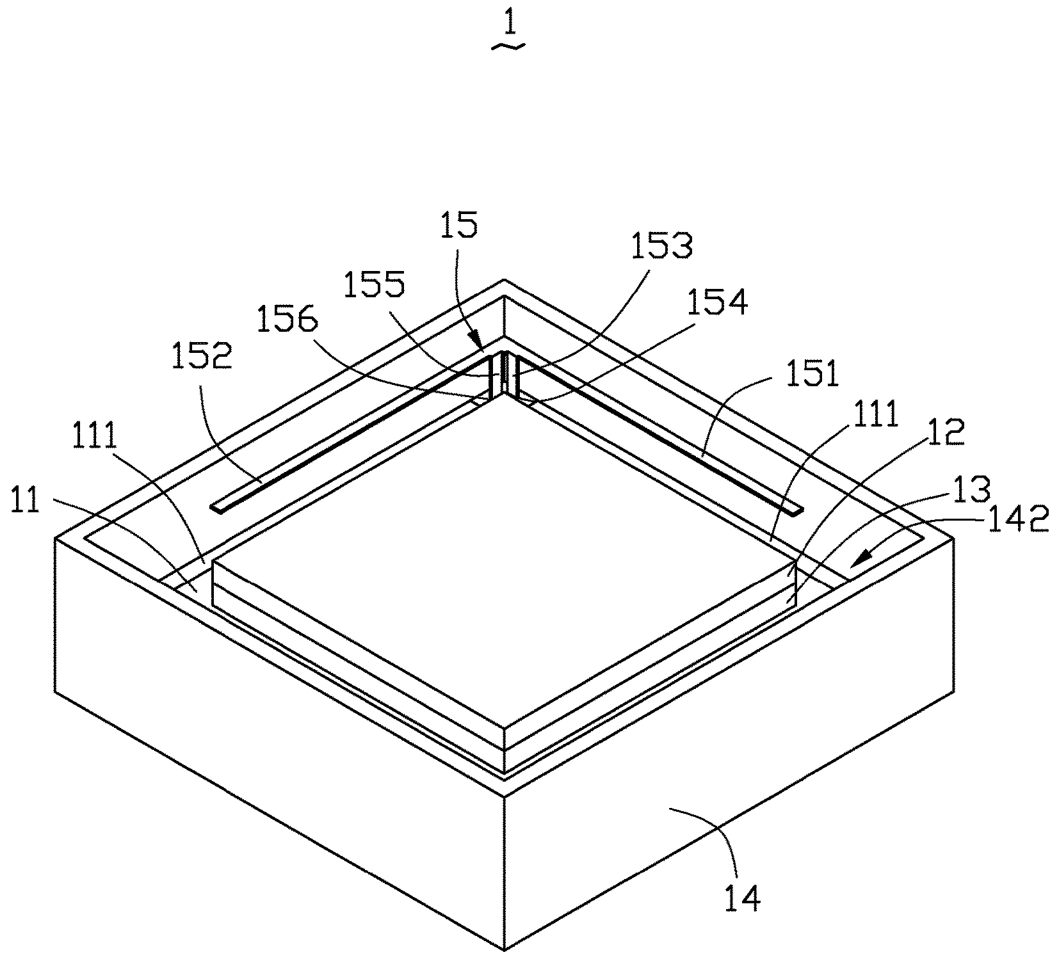
FIG. 1 is an isometric view of a wireless communication device employing an antenna structure, according to a first exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term “coupled” is defined as connected, whether directly or indirectly through intervening components, and is not necessarily limited to physical connections. The connection can be such that the objects are permanently connected or releasably connected. The term “substantially” is defined to be essentially conforming to the particular dimension, shape, or other feature that the term modifies, such that the component need not be exact. For example, substantially cylindrical means that the object resembles a cylinder, but can have one or more deviations from a true cylinder. The term “comprising,” when utilized, means “including, but not necessarily limited to”; it specifically indicates open-ended inclusion or membership in the so-described combination, group, series and the like.

The present disclosure is described in relation to an antenna structure and a wireless communication device using same.

FIG. 1 illustrates an embodiment of a wireless communication device 1 employing an antenna structure 15, according to a first exemplary embodiment. The wireless communication device 1 can be a mobile phone, a tablet, or an intelligent watch, for example (details not shown). The wireless communication device 1 further includes a printed circuit board (PCB) 11, a display screen 12, a shielding can 13, and a housing 14.

In at least one embodiment, the housing 14 can be a rectangular frame, and defines an accommodation space 142 for receiving the PCB 11, a display screen 12, a shielding can 13, and the antenna structure 15.

The PCB 11 is disposed on a bottom wall of the housing 14. The PCB 11 includes two neighbor sides, and each side forms a keep-out-zone 111. The purpose of keep-out-zone 111 is to delineate an area on the PCB 11 in which other electronic components (such as a camera, a vibrator, a speaker, etc.) cannot be placed. The shielding can 13 is fixed to the PCB 11 to cover the electronic components for protecting the electronic components from electromagnetic interference (EMI). The display screen 12 is secured on the shielding can 13, and is coupled to the PCB 11.

In at least one embodiment, the antenna structure 15 can be an inverted-F antenna (PIFA), and is disposed on the two keep-out-zones 111. The antenna structure 15 includes a first radiation arm 151, a second radiation arm 152, a feed end 153, and a ground end 155. In the first exemplary embodiment, both the first radiation arm 151 and the second radiation arm 152 are rectangular beams. The first radiation arm 151 is coplanar with and perpendicular to the second radiation arm 152 to form a junction. A length of the first radiation arm 151 is substantially equal to a length of the second radiation arm 151, and is substantially equal to a quarter-wave of a wireless signal received/transmitted by the antenna structure 15. The feed end 153 is perpendicularly connected between the first radiation arm 151 and the PCB 11. A feed pin 154 is formed on a feed end 153, and is coupled to the PCB 11 to receive signals. The ground end 155 is perpendicularly connected between the second radiation arm 151 and the PCB 11. A ground pin 156 is formed on the ground end 155, and is coupled to the PCB 11. In the first exemplary embodiment, both the feed end 153 and the ground end 155 are positioned near the junction of the first radiation arm 151 and the second radiation arm 152, and a plane of the feed end 153 is substantially perpendicular to a plane of the ground end 155.

Additionally, the feed pin 154 can be coupled to a matching circuit, a switching circuit, or other adjustment circuit having at least one variable capacitor. In at least one embodiment, the antenna structure 15 can be made of metallic sheets or flexible printed circuits (FPC), or can be formed by a sputtering process.

Figure 2:
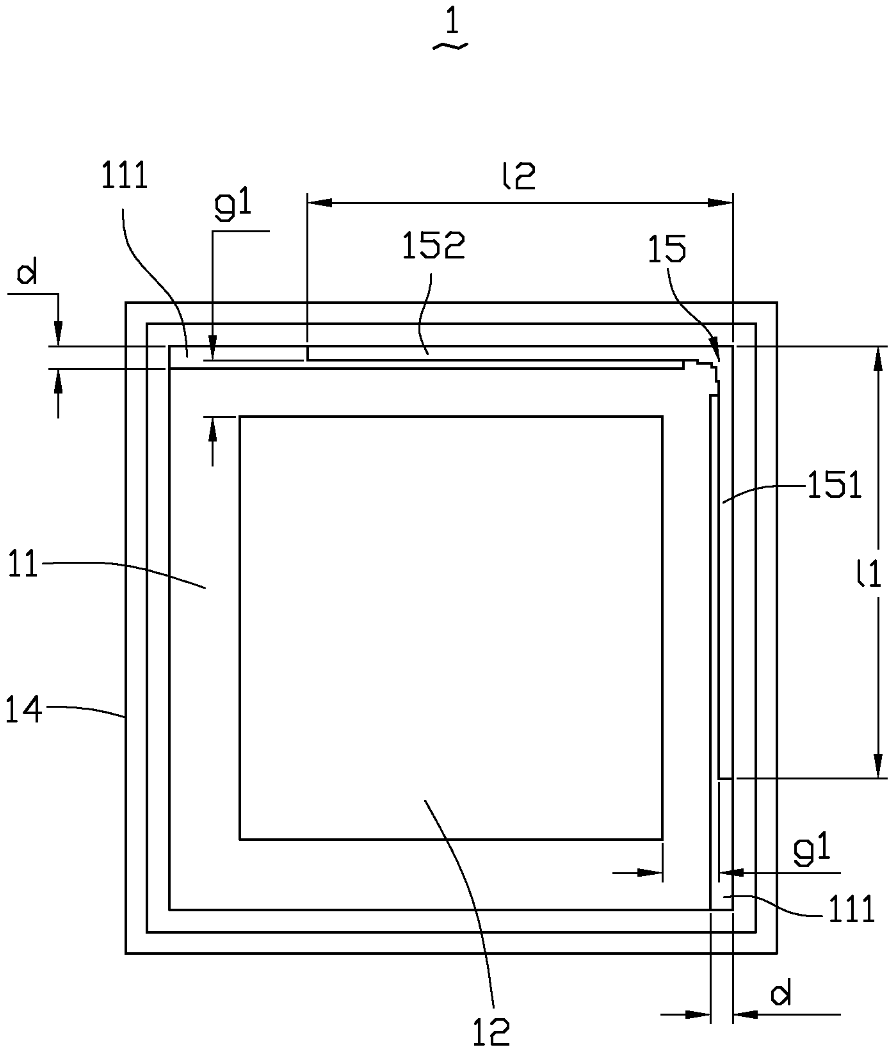
FIG. 2 is a diagrammatic view of the wireless communication device of FIG. 1.

FIG. 2 illustrates a diagrammatic view of the wireless communication device 1. A length of the housing 14 can be within a range of 46.0-46.4 mm, a width of the housing 14 can be within a range of 46.0-46.4 mm, and a height of the housing 14 can be within a range of 13.5-13.9 mm. The PCB 11 is made of composite materials, and a 3-dimensional (3D) size (length, width, height) of the PCB is about 40 mm by 40 mm by 1 mm. A width of the keep-out-zone 111 can be within a range of 1.4-1.8 mm. A length "11" of the first radiation arm 151 can be within a range of 30.5-30.9 mm, and a width "d" of the first radiation arm 151 can be within a range of 0.8-1.2 mm. A length "12" of the second radiation arm 152 can be within a range of 30.0-30.4 mm, and a width "d" of the second radiation arm 152 can be within a range of 0.8-1.2 mm. A width of a first gap "g1" between the first radiation arm 151 and the display screen 12 can be within a range of 3.8-4.2 mm, and a width of a second gap "g2" between the second radiation arm 152 and the display screen 12 can be within a range of 3.8-4.2 mm.

Figure 3:
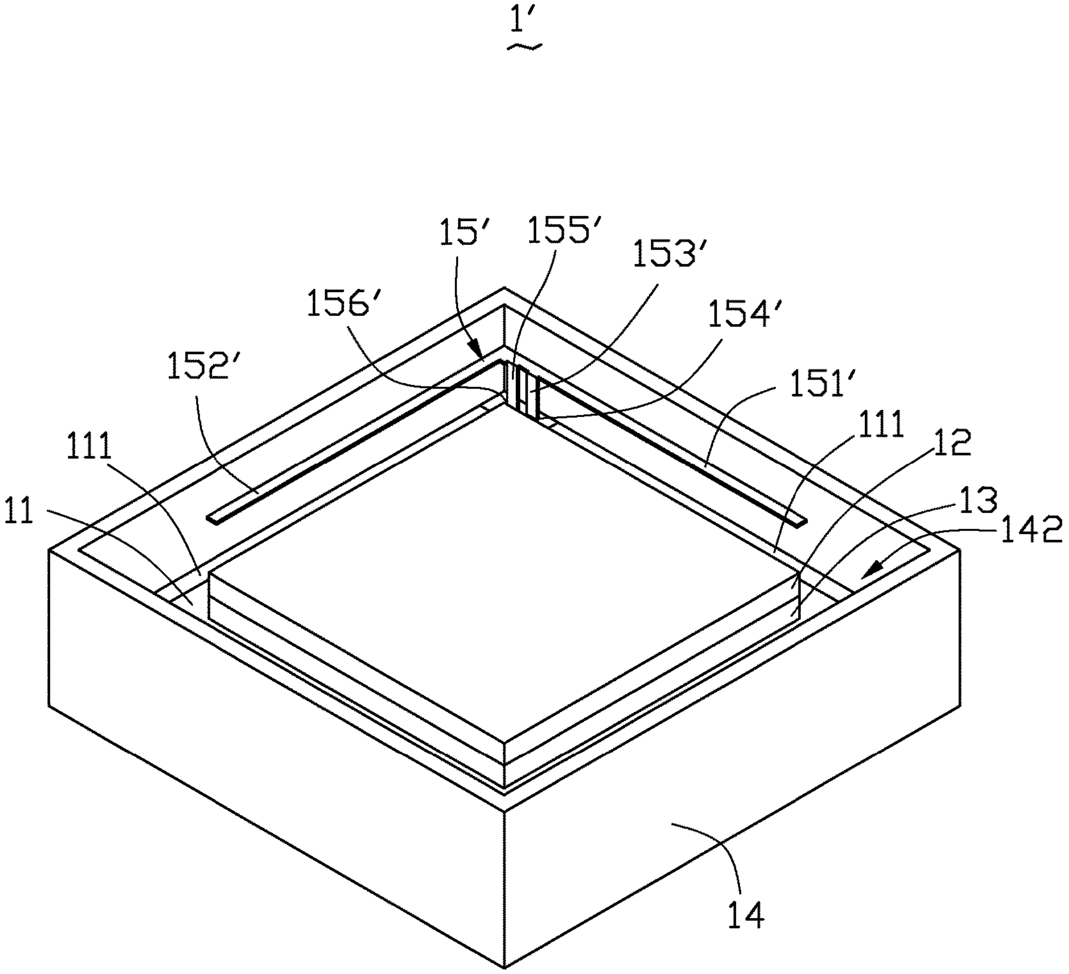
FIG. 3 is an isometric view of a wireless communication device employing an antenna structure, according to a second exemplary embodiment.

FIG. 3 illustrates an embodiment of a wireless communication device 1' employing an antenna structure 15', according to a second exemplary embodiment. The wireless communication device 1' further includes a printed circuit board (PCB) 11, a display screen 12, a shielding can 13, and a housing 14. The housing 14 can be a rectangular frame, and defines an accommodation space 142. The PCB 11 includes two neighbor sides, and each side forms a keep-out-zone 111. The antenna structure 15' of the second exemplary embodiment is substantially same to the antenna structure 15 illustrated in the first exemplary embodiment, and a difference between the antenna structure 15' and the antenna structure 15 is that both a feed end 153' and a ground end 155' are connected between a first radiation arm 151' of the antenna structure 15' and the PCB 11, and are positioned near a junction of the first radiation arm 151' and a second radiation arm 152' of the antenna structure 15'. The feed end 153' is coplanar with the ground end 155', a feed pin 154' is formed on the feed end 153', and a ground pin 156' is formed on the ground end 155'.

Figure 4:
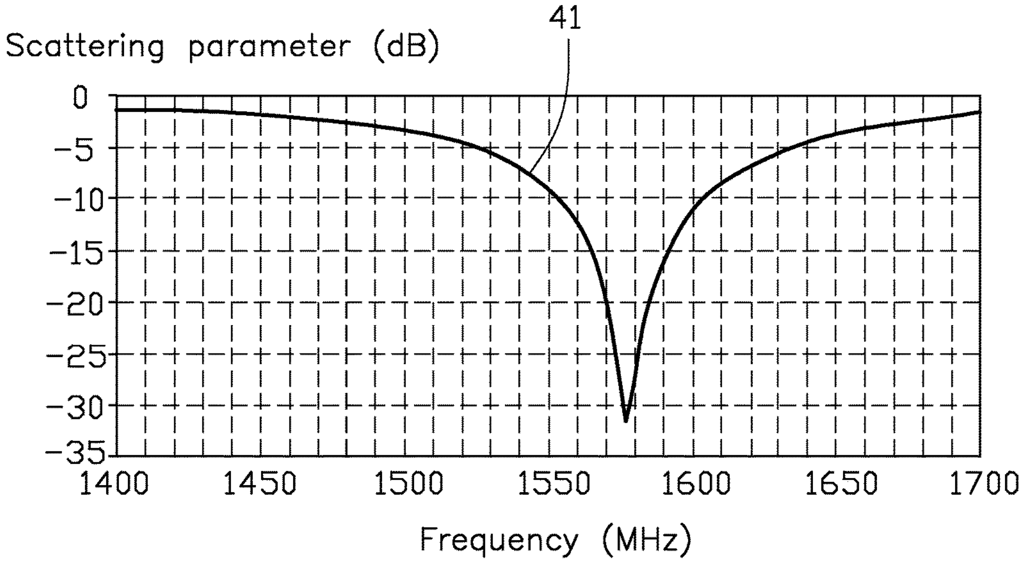
FIG. 4 is a scattering parameter graph of the antenna structure of FIG. 1.

FIG. 4 illustrates a scattering parameter graph of the antenna structure 15. When the first radiation arm 151 is about 30.7 mm, and the second radiation arm 152 is about 30.2 mm, a central frequency of a scattering parameter curve 41 of the antenna structure 15 can be, for example, about 1575 MHZ. Thus, the antenna structure 15 can receive (global positioning system) GPS signals.

Figure 5:
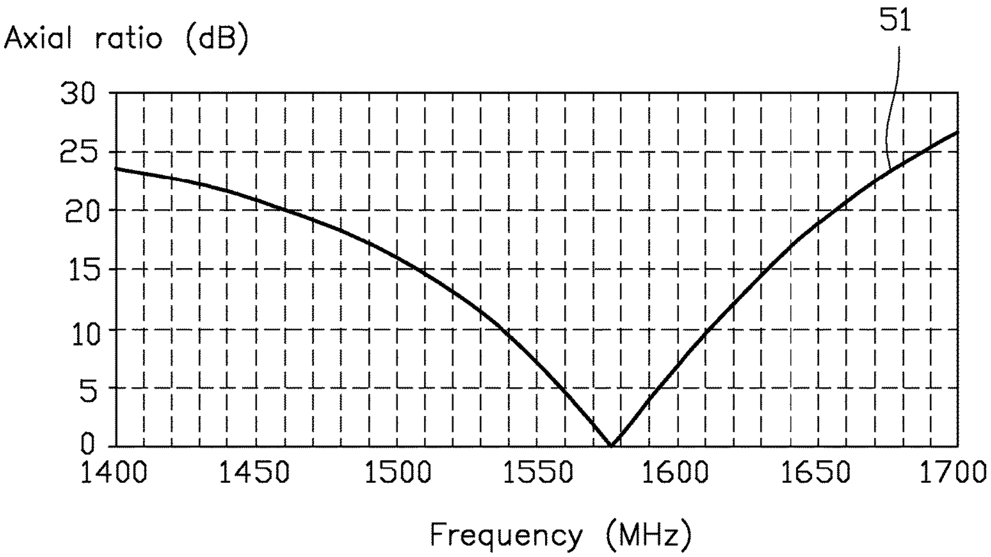
FIG. 5 is an axial ratio graph of the antenna structure of FIG. 1.

FIG. 5 illustrates an axial ratio graph of the antenna structure 15. When the first radiation arm 151 is about 30.7 mm, and the second radiation arm 152 is about 30.2 mm, an axial ratio value of an axial ratio curve 51 is about 0.5 dB at the central frequency of about 1575 MHz, which is less a criterion value of about 3 dB. Thus, the antenna structure 15 can receive GPS circular polarization signals.

Figure 6:
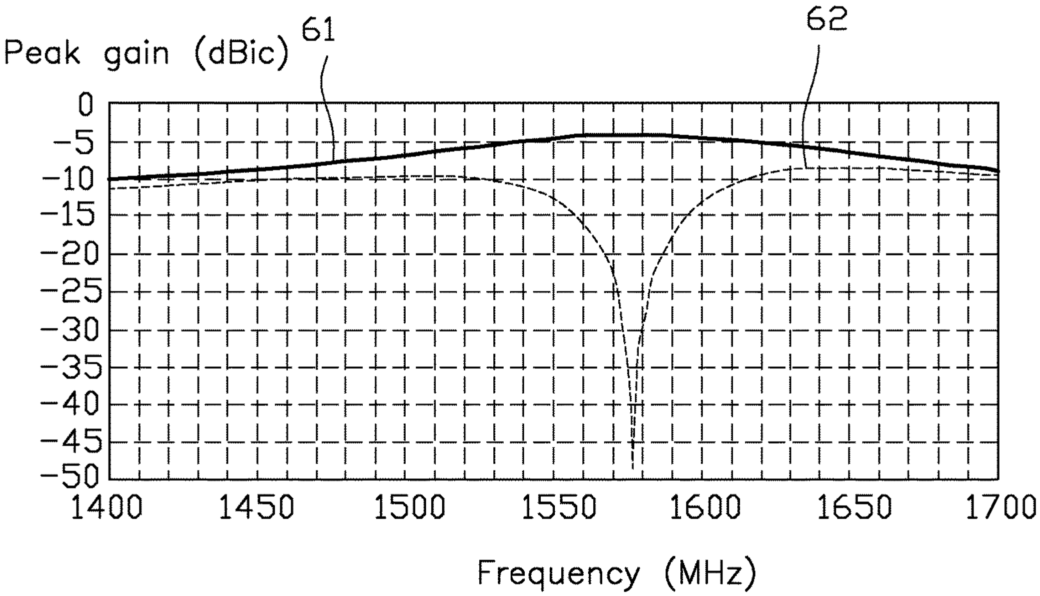
FIG. 6 is a peak gain of circular polarization graph of the antenna structure of FIG. 1.

FIG. 6 illustrates a peak gain of circular polarization graph of the antenna structure 15. A maximum radiation angle of the antenna structure 15 includes θ and φ. The θ can be, for example, about 45 degrees, and the φ can be, for example, about 345 degrees. A first peak gain curve 61 indicates a right hand circular polarization (RHCP) peak gain at the maximum radiation angle, and a second peak gain curve 62 indicates a left hand circular polarization (LHCP) peak gain at the maximum radiation angle. When the first radiation arm 151 is about 30.7 mm, the second radiation arm 152 is about 30.2 mm, and the central frequency is about 1575 MHZ, the RHCP peak gain can be, for example, about −4.2 dBic, and the LHCP peak gain can be, for example, about −35.4 dBic. Thus, a maximum drop between the RHCP and the LHCP is greater than 15 dB. In other words, the RHCP is a main polarization mode of the antenna structure 15 when the central frequency is about 1575 MHZ. Therefore, the antenna structure 15 can receive the GPS RHCP signals. In other embodiments, the LHCP is a main polarization mode of the antenna structure 15 by exchanging positions of the feed end 153 and the ground end 155.

Figure 7:
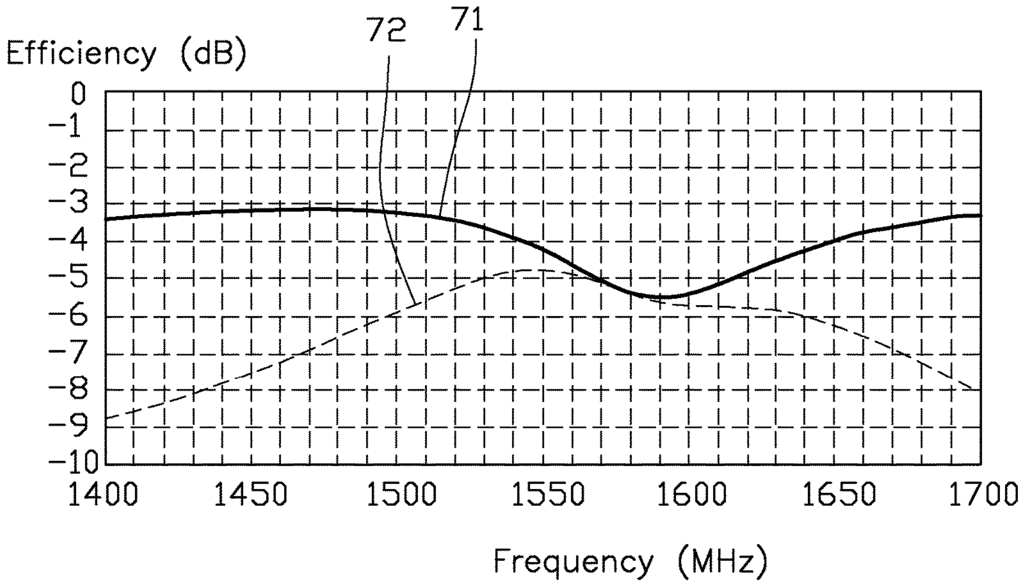
FIG. 7 is an antenna efficiency graph of the antenna structure of FIG. 1.

FIG. 7 is an antenna efficiency graph of the antenna structure 15. A first antenna efficiency curve 71 indicates an ideal efficiency without considering matching loss, and a second antenna efficiency curve 72 indicates an total efficiency including the matching loss. When the first radiation arm 151 is about 30.7 mm, the second radiation arm 152 is about 30.2 mm, and the central frequency is about 1575 MHZ, the total efficiency can be, for example, about −5.2 dB. Thus, the antenna structure 15 has good performance when the central frequency is about 1575 MHZ. Additionally, the total efficiency can be improved by increasing the width of the keep-out-zone 111.

In summary, the antenna structure 15 includes the first radiation arm 151 and a second radiation arm 152 perpendicularly connected to the first radiation arm 151. Thus, two orthogonal currents with same amplitude are triggered, and the two orthogonal currents flowing on the first radiation arm 151 and the second radiation arm 152 with predetermined lengths may cause a phase difference of 90 degrees. Thus, resonance conditions of a circular polarization antenna can be achieved. In addition, the antenna structure 15 is disposed at two sides of the wireless communication device 1, which allows further size reductions of the wireless communication device 1 employing the antenna structure 15.

The embodiments shown and described above are only examples. Many details are often found in the art such as the other features of the antenna structure and the wireless communication device. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. An antenna structure, comprising:

a first radiation arm;

a second radiation arm perpendicularly connected to the first radiation arm;

a feed end; and a ground end;

wherein the antenna structure, a printed circuit board (PCB), a shielding can, and a display screen are received in an accommodation space of a housing;

wherein the antenna structure is disposed on the printed circuit board (PCB) of a wireless communication device, the PCB is disposed on a bottom wall of the housing of the wireless communication device; the shielding can is fixed to the PCB to cover electronic components for protecting electronic components from electromagnetic interference, and the display screen is secured on the shielding can; the PCB comprises two neighboring sides, each side comprises a keep-out-zone that delineates an area on the PCB in which the placement of other electronic components is forbidden, wherein each keep-out-zone is bounded between an outer wall of the housing and the shielding can, the first radiation arm and the second radiation arm are respectively received in the two keep-out-zones, the first radiation arm and the second radiation arm jointly form a junction where the two neighboring keep-out-zones meet, both the feed end and the ground end are positioned at a corner of the housing and are connected to the junction;

wherein both the first radiation arm and the second radiation arm are rectangular beams, and the first radiation arm is coplanar with the second radiation arm, the first radiation arm and the second radiation arm capable of triggering two orthogonal currents with same amplitude and causing a phase difference of 90 degrees, and the feed end is positioned in a plane perpendicular to the ground end.

2. The antenna structure as claimed in claim 1, wherein the feed end is perpendicularly connected to the first radiation arm, and the ground end is perpendicularly connected to the second radiation arm.

3. The antenna structure as claimed in claim 2, wherein a feed pin is formed on the feed end, and a ground pin is formed on the ground end.

4. A wireless communication device, comprising:

a housing comprising four side walls perpendicularly connected to each other and a bottom wall perpendicularly connected to the four side walls;

a printed circuit board (PCB), wherein the PCB is disposed on the bottom wall of the housing;

a shielding can fixed to the PCB to cover electronic components for protecting electronic components from electromagnetic interference;

a display screen secured on the shielding can, wherein the PCB comprises two neighboring sides, and each side comprises a keep-out-zone that delineates an area on the PCB in which the placement of other electronic components is forbidden; wherein each keep-out-zone is bounded between an outer wall of the housing and the shielding can and an antenna structure comprising:

a first radiation arm;

a second radiation arm perpendicularly connected to the first radiation arm;

a feed end; and a ground end;

wherein the antenna structure, the PCB, the shielding can, and the display screen are received in an accommodation space of the housing;

wherein the antenna structure is disposed on the PCB, the first radiation arm and the second radiation arm are respectively received in the two keep-out-zones, the first radiation arm and the second radiation arm jointly form a junction where the two neighboring keep-out-zones meet, both the feed end and the ground end are positioned at a corner of the housing and connected to the junction;

wherein both the first radiation arm and the second radiation arm are rectangular beams, and the first radiation arm is coplanar with the second radiation arm, the first radiation arm and the second radiation arm capable of triggering two orthogonal currents with same amplitude and causing a phase difference of 90 degrees, and the feed end is positioned in a plane perpendicular to the ground end.

5. The wireless communication device as claimed in claim 4, wherein the feed end is perpendicularly connected between the first radiation arm and the PCB, and the ground end is perpendicularly connected between the second radiation arm and the PCB.

6. The wireless communication device as claimed in claim 5, wherein a feed pin is formed on the feed end, and a ground pin is formed on the ground end.

7. The wireless communication device as claimed in claim 4, the feed end is parallel to and spaced from the one of the side walls, the ground end is parallel to and spaced from the another one of the side walls.

* * * * *